US012392250B2

(12) United States Patent
Murray et al.

(10) Patent No.: US 12,392,250 B2
(45) Date of Patent: Aug. 19, 2025

(54) GUIDE VANE ASSEMBLY

(71) Applicant: Rolls-Royce plc, London (GB)

(72) Inventors: Christopher A. Murray, Nottingham (GB); Nicholas Howarth, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/909,133

(22) Filed: Oct. 8, 2024

(65) Prior Publication Data

US 2025/0137382 A1 May 1, 2025

(30) Foreign Application Priority Data

Oct. 26, 2023 (GB) ..................................... 2316388

(51) Int. Cl.
*F01D 9/06* (2006.01)
*F01D 9/04* (2006.01)
*F01D 17/14* (2006.01)

(52) U.S. Cl.
CPC ............. *F01D 9/065* (2013.01); *F01D 9/041* (2013.01); *F01D 17/141* (2013.01); *F05D 2240/12* (2013.01); *F05D 2240/24* (2013.01); *F05D 2240/55* (2013.01)

(58) Field of Classification Search
CPC . F01D 9/06; F01D 9/065; F01D 9/041; F01D 17/14; F01D 17/141; F01D 17/143; F05D 2240/12; F05D 2240/55; F02C 9/20
See application file for complete search history.

(56) References Cited

U.S. PATENT DOCUMENTS 4,557,665 A * 12/1985 Szczupak .............. F01D 17/143 417/407
2011/0100000 A1* 5/2011 Garrett .................... F01D 9/026 415/151
2011/0168843 A1 7/2011 Calder
2018/0372559 A1 12/2018 Parsons et al.
2020/0165921 A1 5/2020 Spangler et al.

FOREIGN PATENT DOCUMENTS

| | | | |
|---|---|---|---|
| CN | 101512107 | A | 8/2009 |
| DE | 3844189 | A1 | 7/1990 |
| EP | 3633151 | A1 | 4/2020 |
| GB | 1163328 | A | 9/1969 |

OTHER PUBLICATIONS

Great Britain search report dated Mar. 25, 2024, issued in GB Patent Application No. 2316388.4.
European Search report dated Mar. 6, 2025, issued in EP Patent Application No. 24202741.5.

* cited by examiner

*Primary Examiner* — Andrew H Nguyen

(57) ABSTRACT

A guide vane assembly includes a guide vane and a sealing assembly slidable along a span of the guide vane relative to the guide vane and extending along a chordal axis and the span of the guide vane. The sealing assembly includes a plate configured to be disposed around at least a portion of an external surface of the guide vane. The sealing assembly further includes a manifold coupled to the plate and configured to receive pressurized fluid therein. The manifold is disposed around the plate. The sealing assembly further includes a plurality of flow tubes extending between the manifold and the plate. Each of the plurality of flow tubes are configured to receive the pressurized fluid from the manifold.

14 Claims, 7 Drawing Sheets

GUIDE VANE ASSEMBLY

CROSS-REFERENCE TO RELATED APPLICATIONS

This specification is based upon and claims the benefit of priority from United Kingdom patent application number GB 2316388.4 filed on Oct. 26, 2023, the entire contents of which is incorporated herein by reference.

BACKGROUND

Technical Field

The present disclosure relates to a guide vane assembly, e.g. for a gas turbine engine, a guide vane system that includes the guide vane assemblies, and a rotary machine that includes the guide vane system.

Description Of the Related Art

A gas turbine engine may include a guide vane assembly. The guide vane assembly typically includes a circumferential array of conventionally variable guide vanes. Such a conventionally variable guide vane system may be associated, for example, with a cabin blower system of the gas turbine engine that may be used to maintain a desired pressure inside a cabin of the aircraft. The guide vane assembly may expand an operating range and improve an efficiency of the cabin blower system.

Generally, the guide vane assembly may require multiple rotational bushings, seals, and a complex unison ring to effect consistent actuation of all vanes. The guide vane assembly may include a mechanical seal that may be in direct contact with the guide vane to prevent leakage of a fluid from a flow region, which may otherwise affect an efficiency of the guide vane assembly. Further, such seals may be made from a material that may not be suitable for high temperature applications. In some examples, the seal may include a carbon seal that is prone to wear and may negatively impact a sealing performance and system force margins. Further, failure of the seal may lead to an undesirable increase in maintenance costs associated with the guide vane assembly. Further, some conventional mechanical seals may have moving parts that may lead to wear and tear and may also have a complex design.

Thus, conventional seals of the guide vane assembly may be costly, may not provide efficient sealing, and may be prone to wear and tear. Therefore, an improved sealing assembly may be required for the guide vane assembly to address the above-described shortcomings.

SUMMARY

In a first aspect, there is provided a guide vane assembly. The guide vane assembly includes a guide vane. The guide vane includes an aerofoil. The aerofoil includes a leading edge, a trailing edge, a suction surface, a pressure surface, a root, and a tip. The aerofoil defines a chordal axis of the guide vane between the leading edge and the trailing edge. The aerofoil further defines a span of the guide vane between the root and the tip. The pressure surface and the suction surface together define an external surface of the guide vane. The guide vane assembly further includes a sealing assembly slidable along the span of the guide vane relative to the guide vane and extending along the chordal axis and the span of the guide vane. The sealing assembly includes a plate configured to be disposed around at least a portion of the external surface of the guide vane. The plate is spaced apart from the external surface of the guide vane to define a clearance therebetween. The plate defines a plurality of openings extending therethrough. Each of the plurality of openings is in fluid communication with the clearance between the plate and the guide vane. The sealing assembly further includes a manifold coupled to the plate and configured to receive pressurized fluid therein. The manifold is disposed around the plate. The sealing assembly further includes a plurality of flow tubes extending between the manifold and the plate. Each of the plurality of flow tubes defines a flow passage that is in fluid communication with a corresponding opening in the plate. Each of the plurality of flow tubes are configured to receive the pressurized fluid from the manifold. Each opening in the plate receives the pressurized fluid from a corresponding flow tube of the plurality of flow tubes to direct a jet of pressurized fluid towards the external surface of the guide vane to seal the clearance between the plate and the guide vane.

The sealing assembly described herein provides a non-contacting and non- wearing means to seal the clearance around the guide vane. The sealing assembly uses the pressurized fluid to seal the clearance between the plate and the guide vane. The sealing assembly may prevent the leakage of fluid around a perimeter of the guide vane i.e., around the pressure surface and the suction surface of the aerofoil and may ensure smooth operation of the guide vane assembly. Further, the plate and the manifold may be made of a metallic material and does not include any moving parts. Since the sealing assembly has a substantially smaller number of moving parts and does not mechanically contact the guide vane, the sealing assembly may be capable to withstand high operational temperatures and may be less susceptible to wear and tear. Thus, the sealing assembly may have an improved life cycle, and may also reduce maintenance as well as replacement costs associated with the guide vane assembly. Also, the sealing assembly may eliminate any frictional sealing translational forces between the guide vane and the plate of the sealing assembly, thereby reducing actuation system force requirements and force margins. Furthermore, the plate and the manifold of the sealing assembly may be less prone to wear thereby increasing an efficiency of the sealing assembly.

The sealing assembly may eliminate mechanical side loading forces such as toeing and heeling of the plate onto each guide vane. The sealing assembly may be simple in construction, may be easy to manufacture in a cost-effective manner, and may increase an efficiency of the guide vane assembly. Furthermore, the sealing assembly may be associated with various guide vane systems that may be disposed upstream or downstream of various types of compressors or turbines. For example, the sealing assembly may be associated with guide vanes on any inward flow radial turbine application. Further, the sealing assembly may be employed in any fixed guide vane, i.e., non-rotational vanes, having a variable flow area geometry based on application requirements.

In some embodiments, a width of the sealing assembly parallel to the span is less than a span length of the guide vane along the span, such that the sealing assembly divides the external surface of the guide vane between a flow region extending from the tip and an intended non-flowing region extending from the root. The sealing assembly is configured to prevent a leakage of fluid between the flow region and the intended non-flowing region. The sealing assembly is further configured to vary an area of the flow region by sliding along the span of the guide vane.

Thus, the sealing assembly is slidable along the span of the guide vane to prevent any leakage of the fluid from the flow region towards the intended non- flowing region, which may in turn increase the efficiency of the guide vane assembly and may ensure a stable operation of the guide vane assembly.

In some embodiments, the guide vane assembly further includes an actuator operatively coupled to the sealing assembly. The actuator is configured to slide the sealing assembly along the span of the guide vane relative to the guide vane. The actuator may include a pneumatic actuator, a hydraulic actuator, a fluidic actuator, an electric actuator, or a passive actuator arrangement that may be configured to slide the sealing assembly along the span. As the actuator facilitates the sliding of the sealing assembly along the span length, the flow region of the guide vane may be varied which may in turn allow tuning of air flow being directed by the guide vane.

In some embodiments, at least some of the plurality of flow tubes include different average cross-sectional areas. The flow tubes with different average cross-sectional areas may be used to modify a pressure drop that the flow experiences as it flows through the flow tubes. Further, flow tubes with different average cross-sectional areas may direct jets of pressurized fluid at different speed, pressure, and flow rates towards the external surface of the guide vane to seal the clearance between the plate and the guide vane. The flow tubes may be designed to balance the delivery pressure proximal to the guide vane with a main gas path pressure at that location around the guide vane.

In some embodiments, each of the plurality of flow tubes has a variable cross-sectional area. The plurality of flow tubes having the variable cross- sectional area may direct jets of pressurized fluid towards the clearance between the plate and the guide vane, thereby providing efficient sealing between the flow region and the intended non-flowing region. The plurality of flow tubes defines a first diameter proximal to the manifold and a second diameter proximal to the plate. The first diameter is greater than the second diameter, such that the flow tubes have a tapering cross-sectional area. Further, the opening in the plate defines a diameter that corresponds to the second diameter of the plurality of flow tubes. Each of the flow tubes may be shaped as a nozzle to accelerate and control the pressurized fluid received from the manifold.

In some embodiments, at least some of the plurality of openings in the plate include different cross-sectional areas. The plurality of openings with different cross-sectional areas may balance a delivery pressure proximal to the guide vane with a main fluid path pressure at that location around the guide vane. The plurality of openings in the plate may act as a piccolo tube and may form a seal around the corresponding guide vane to prevent the leakage of fluid across the sealing assembly. Further, the plurality of openings with different cross-sectional areas may enhance sealing around the guide vane.

In some embodiments, at least some of the plurality of flow tubes extend orthogonally relative to the plate of the sealing assembly. The plurality of flow tubes may extend orthogonally based on a profile of the guide vane as well as a location of the flow tube relative to the guide vane. For example, the flow tubes disposed along the pressure surface or the suction surface may extend orthogonally relative to the plate of the sealing assembly. It should be noted that, by virtue of the orientation of the flow tubes, the flow tubes jet the pressurized air in a direction that impinges on the guide vane at 90 degrees to the external surface of the guide vane, as may be preferential to minimise leakage across the sealing assembly.

In some embodiments, at least some of the plurality of flow tubes extend obliquely relative to the plate of the sealing assembly. The plurality of flow tubes may extend obliquely based on the profile of the guide vane as well as a location of the flow tube relative to the guide vane. For example, some of the flow tubes disposed proximal to the trailing edge or the leading edge of the guide vane May extend obliquely relative to the plate of the sealing assembly. It should be noted that, by virtue of the orientation of the flow tubes, the flow tubes may be orientated at an inclined angle and as such the jets of pressurized air from the flow tubes impinge the external surface of the guide vane at a compound angle as may be preferential to minimise leakage across the sealing assembly.

In a second aspect, there is provided a guide vane system. The guide vane system includes a circumferential array of guide vane assemblies of the first aspect. The guide vane system further includes an annular ring fixedly coupled to each guide vane assembly and including an annular chamber disposed in fluid communication with the manifold of the sealing assembly of each guide vane assembly. The annular chamber is configured to receive the pressurized fluid and direct the pressurized fluid towards the manifold of the sealing assembly of each guide vane assembly. The annular chamber may receive the pressurized fluid bled from a rotary machine, such as a compressor. Alternatively, the annular chamber may receive the pressurized air from the leading edge or the trailing edge of the guide vane.

In some embodiments, the guide vane system further includes a pair of end plates coupled to the guide vane of each guide vane assembly. The pair of end plates are spaced apart from each other along the span of the guide vane. The sealing assembly is slidable along the span of the guide vane between the pair of end plates. The sealing assembly may slide along the span of the guide vane between the pair of end plates to prevent leakage from the flow region towards the intended non-flowing region, which may increase an efficiency of the guide vane system and facilitate stable operation of the guide vane system.

In a third aspect, there is provided a rotary machine. The rotary machine includes a rotor assembly including an upstream end and a downstream end. The rotary machine further includes the guide vane system of the second aspect. The annular chamber of the guide vane system is configured to receive the pressurized fluid from the upstream end or the downstream end of the rotor assembly. In other words, the annular chamber may receive the pressurized fluid bled from the upstream end or the downstream end of the rotary machine.

In some embodiments, the rotor assembly includes a compressor. Thus, the annular chamber may receive the pressurized fluid bled from the upstream end or the downstream end of the compressor.

In some embodiments, the guide vane system is disposed downstream of the rotor assembly. In such an example, the guide vane system is embodied as an exit guide vane system that may increase an efficiency of the rotor assembly and may facilitate stable operation of the rotor assembly by controlling a desired flow rate of the fluid being directed by the rotor assembly.

In some embodiments, the guide vane system is disposed upstream of the rotor assembly. In such an example, the guide vane system is embodied as an inlet guide vane system that may increase the efficiency of the rotor assembly and may facilitate stable operation of the rotor assembly by controlling a desired flow rate of the fluid being directed towards the rotor assembly.

In a fourth aspect, there is provided a cabin blower system of an aircraft. The cabin blower system includes the rotary machine of the third aspect. The cabin blower system may control a temperature and a pressure inside a cabin of the aircraft, thereby ensuring habitable conditions within the cabin. Further, the sealing assembly may maximise an efficiency of the rotary machine of the cabin blower system by preventing flow separation and/or turbulence.

In a fifth aspect, there is provided a gas turbine engine including the guide vane system of the second aspect.

As used herein, the term "configured to" and like is at least as restrictive as the term "adapted to" and requires actual design intention to perform the specified function rather than mere physical capability of performing such a function.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
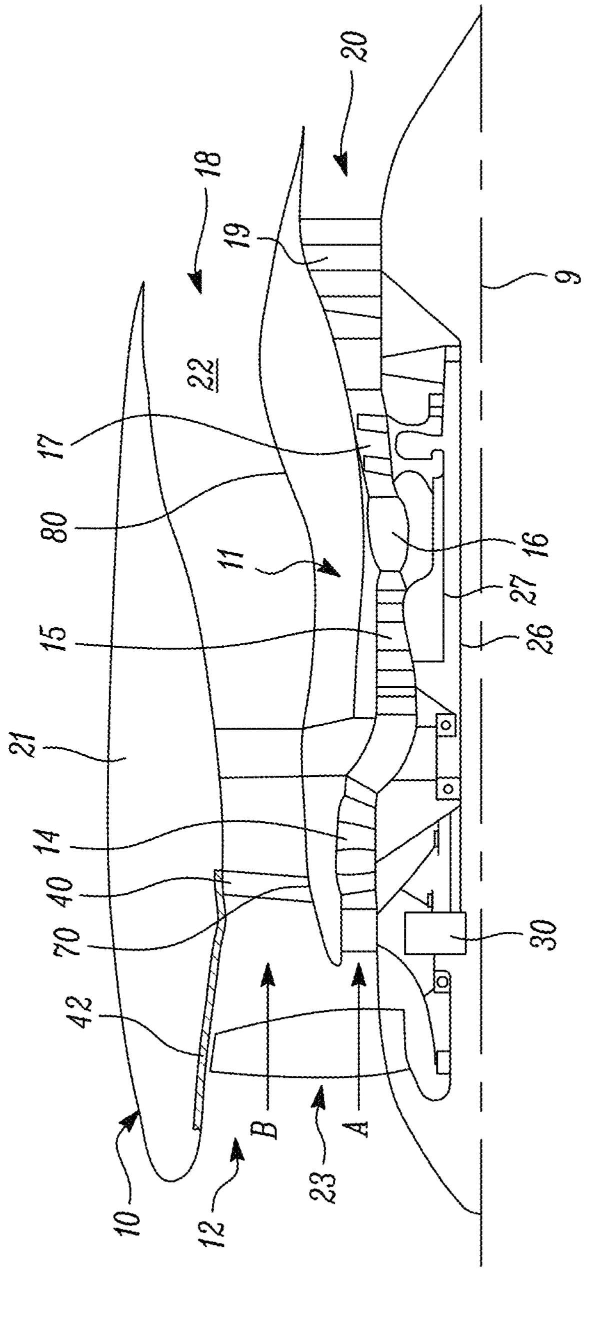
FIG. 1 is a schematic side view of a gas turbine engine.

FIG. 1 illustrates a schematic side view of a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises an engine core 11 that receives the core airflow A. In other words, the core airflow A enters the engine core 11. The fan 23 is located upstream of the engine core 11. The fan 23 generates the core airflow A and the bypass airflow B. The engine core 11 comprises, in axial flow series, a compressor, a combustor, and a turbine. Specifically, the engine core 11 comprises, in axial flow series, a low pressure compressor 14, a high pressure compressor 15, a combustor 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22 surrounding the engine core 11. The bypass airflow B flows through the bypass duct 22 to provide propulsive thrust, where it is straightened by a row of outer guide vanes 40 before exiting the bypass exhaust nozzle 18. The outer guide vanes 40 extend radially outwardly from an inner ring 70 which defines a radially inner surface of the bypass duct 22. Rearward of the outer guide vanes 40, the engine core 11 is surrounded by an inner cowl 80 which provides an aerodynamic fairing defining an inner surface of the bypass duct 22. The inner cowl 80 is rearwards of and axially spaced from the inner ring 70. A fan case 42 defines an outer surface of the bypass duct 22. The inner ring 70 defines the inner surface of the bypass duct 22 towards the rear of the fan case 42. The gas turbine engine 10 includes a shaft 26. The fan 23 is attached to and driven by the low pressure turbine 19 via the shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. A core shaft 27 connects the turbine 17, 19 to the compressor 14, 15. Specifically, the high pressure turbine 17 drives the high pressure compressor 15 by the suitable core shaft 27 or an interconnecting shaft. The fan 23 generally provides the majority of the propulsive thrust. The epicyclic gearbox 30 is a reduction gearbox.

Figure 2:
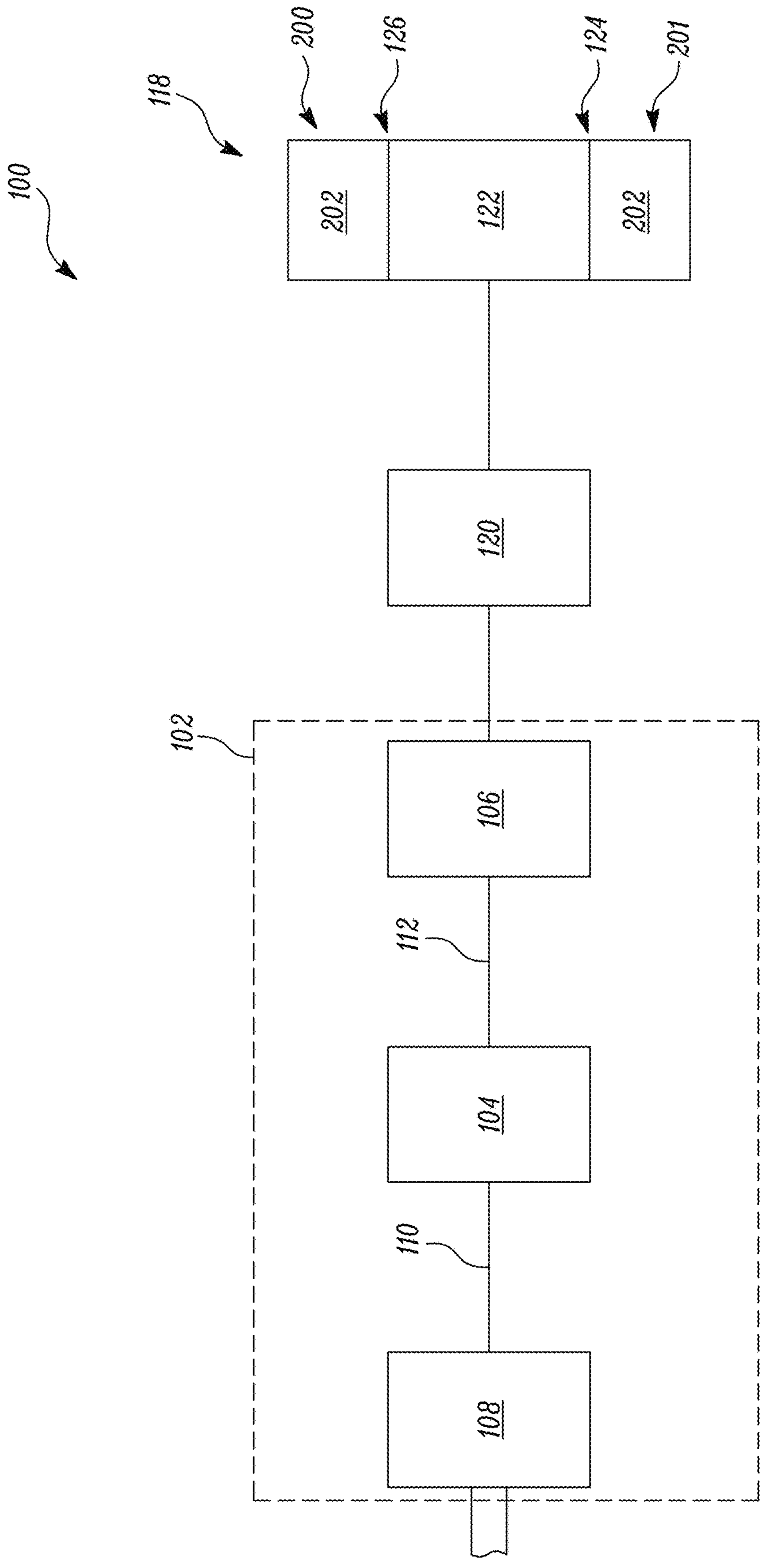
FIG. 2 is a schematic view of a cabin blower system of an aircraft.

FIG. 2 is a schematic view of a cabin blower system 100 of an aircraft. The aircraft is not shown for illustrative purposes. The cabin blower system 100 is associated with the gas turbine engine 10 of FIG. 1. The cabin blower system 100 includes a hydraulic system 102. The hydraulic system 102 includes a valve assembly 104. The hydraulic system 102 further includes a first hydraulic device 106 and a second hydraulic device 108. In some examples, each of the first hydraulic device 106 and the second hydraulic device 108 may include a digital displacement pump capable of acting both as a hydraulic pump and as a hydraulic motor. The second hydraulic device 106 may be mechanically coupled to a spool (not shown) of the gas turbine engine 10 (see FIG. 1). The hydraulic system 102 further includes a hydraulic circuit 110. The valve assembly 104 is communicably coupled to the second hydraulic device 108 via the hydraulic circuit 110 that may control the actuation of the second hydraulic device 108. The hydraulic system 102 further includes a conduit 112. The valve assembly 104 is communicably coupled to the first hydraulic device 106 via the conduit 112 that may control the actuation of the first hydraulic device 106.

The cabin blower system 100 further includes a rotary machine 118. The first hydraulic device 104 of the cabin blower system 100 is mechanically coupled to the rotary machine 118 via an epicyclic gearbox 120. The rotary machine 118 includes a rotor assembly 122 including an upstream end 124 and a downstream end 126. In some embodiments, the rotor assembly 122 includes a compressor. Alternatively, the rotor assembly 122 may include any other rotating component. Accordingly, the rotor assembly 122 may include a high speed wheel. When, in use, a driving force supplied by the spool of the gas turbine engine 10 causes the second hydraulic device 108 to pump liquid provided in the hydraulic circuit 110 and thereby to drive the first hydraulic device 106, which in turn rotates the rotor assembly 122. Although the cabin blower system 100 described herein employs a hydraulic variator system for speed control, it should be noted that the cabin blower system 100 may include any one of an electric variator system, a mechanical variator system, and the like for speed control. It should be noted that the cabin blower system 100 described herein is exemplary in nature, and the cabin blower system 100 may include any other combination of components to perform the intended function.

The rotary machine 118 further includes guide vane systems 200, 201. The guide vane system 200 is disposed downstream of the rotor assembly 122 of the rotary machine 118. The guide vane system 200 disposed downstream of the rotor assembly 122 may be embodied as an exit guide vane system. The guide vane system 201 is disposed upstream of the rotor assembly 122 of the rotary machine 118. The guide vane system 201 disposed upstream of the rotor assembly 122 may be embodied as an inlet guide vane system. Each guide vane system 200, 201 may increase an efficiency of the rotor assembly 122 and may facilitate stable operation of the rotor assembly 122 by controlling a desired flow rate of the fluid being directed by the rotor assembly 122. Each guide vane system 200, 201 includes a circumferential array of guide vane assemblies 202 (schematically illustrated herein). The guide vane assemblies 202 will be explained in greater detail later in this section. The rotor assembly 122 compresses the fluid into a pressurized fluid that is directed towards the array of the guide vane assemblies 202.

Figure 3:
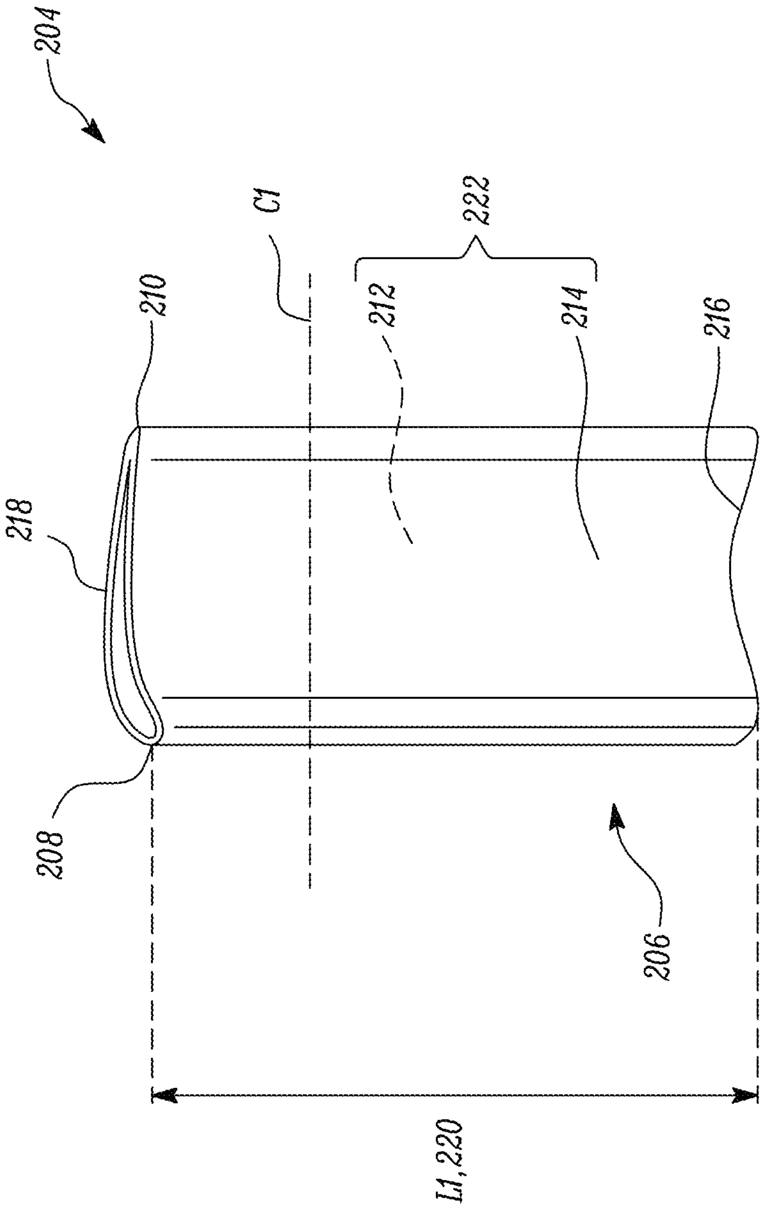
FIG. 3 is a schematic perspective view of a guide vane associated with a guide vane assembly of the cabin blower system of FIG. 2.
Figure 4:
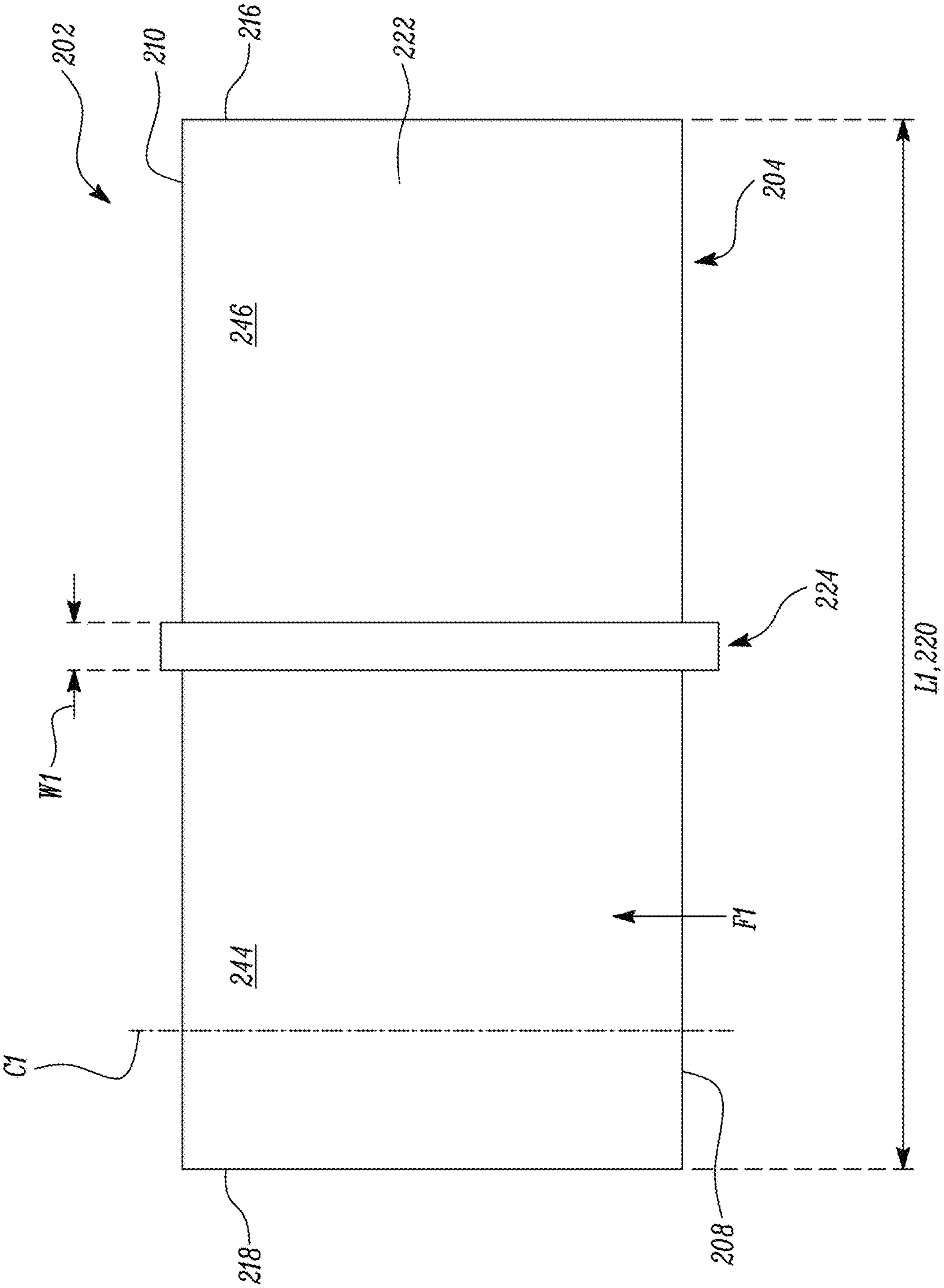
FIG. 4 is a schematic view of the guide vane assembly.
Figure 5:
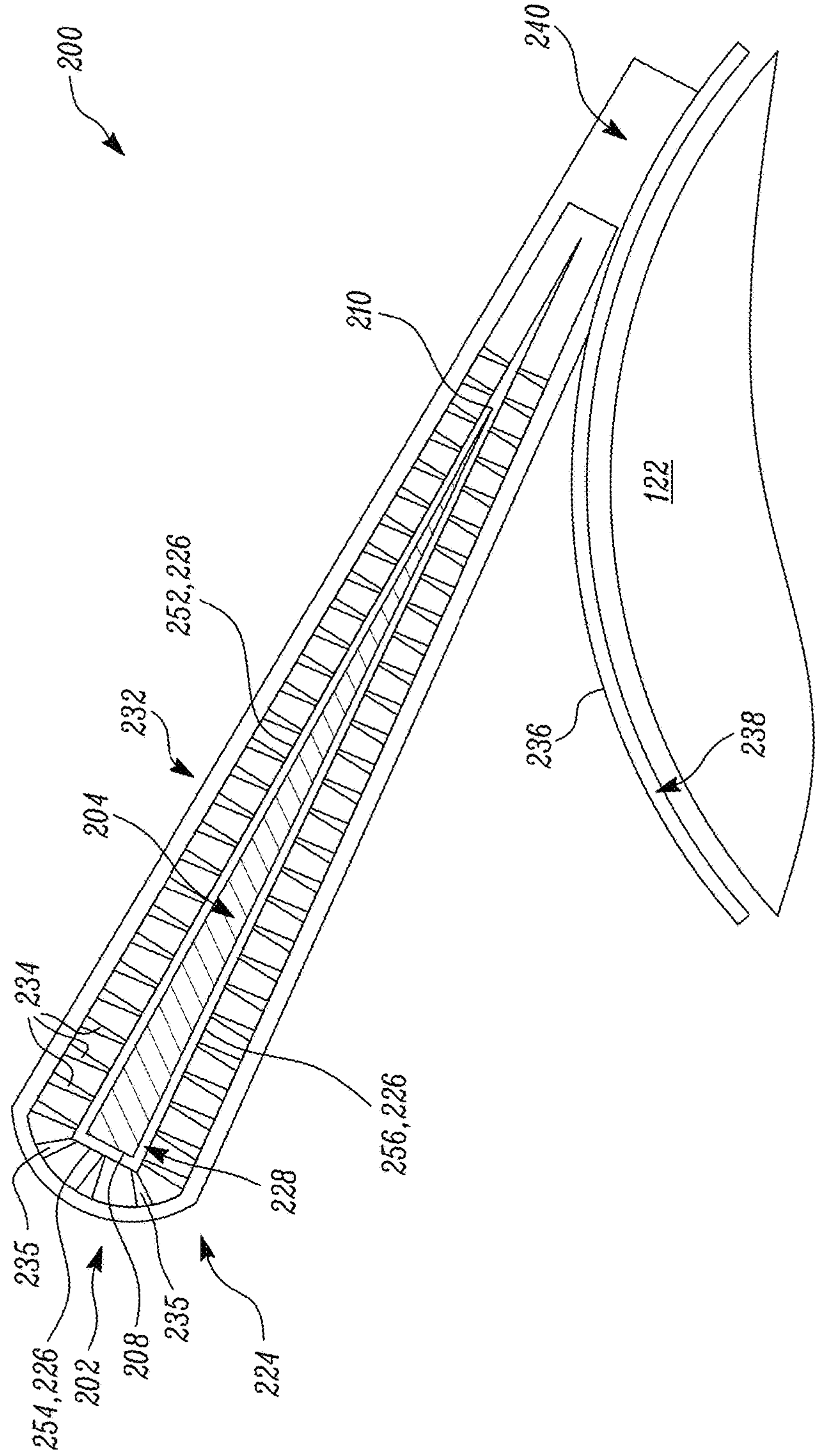
FIG. 5 is a schematic sectional side view of a guide vane system including the guide vane assembly of FIG. 4, associated with the cabin blower system of FIG. 2.

FIG. 3 is a schematic perspective view of a guide vane 204 associated with the guide vane assembly 202 (see FIGS. 2, 4, and 5). The guide vane assembly 202 includes the guide vane 204. The guide vane 204 is embodied as a stationary vane herein. The guide vane 204 includes an aerofoil 206. The aerofoil 206 includes a leading edge 208, a trailing edge 210, a suction surface 212, a pressure surface 214, a root 216, and a tip 218. The pressure surface 214 is opposite the suction surface 212. The aerofoil 206 defines a chordal axis C1 of the guide vane 204 between the leading edge 208 and the trailing edge 210. The aerofoil 206 further defines a span 220 of the guide vane 204 between the root 216 and the tip 218. The pressure surface 214 and the suction surface 212 together define an external surface 222 of the guide vane 204.

FIG. 4 is a schematic view of the guide vane assembly 202. The guide vane assembly 202 includes a sealing assembly 224 slidable along the span 220 of the guide vane 204 relative to the guide vane 204 and extending along the chordal axis C1 and the span 220 (see FIG. 3) of the guide vane 204. A width W1 of the sealing assembly 224 parallel to the span 220 is less than a span length L1 of the guide vane 204 along the span 220, such that the sealing assembly 224 divides the external surface 222 of the guide vane 204 between a flow region 244 extending from the tip 218 and an intended non-flowing region 246 extending from the root 216. A flow direction F1 for compressing is also illustrated in FIG. 4. The sealing assembly 224 is configured to prevent a leakage of fluid from the flow region 244 towards the intended non-flowing region 246. Specifically, the sealing assembly 224 is configured to prevent a leakage of compressed air from the flow region 244 towards the intended non-flowing region 246, which may increase the efficiency of the guide vane assembly 202 and may ensure a stable operation of the guide vane assembly 202. The sealing assembly 224 is further configured to vary an area of the flow region 244 by sliding along the span 220 of the guide vane 204.

FIG. 5 is a schematic sectional side view of the guide vane system 200, associated with the cabin blower system 100 of FIG. 2. The single guide vane 204 is shown herein for illustrative purposes, however, multiple such guide vanes 204 may be arranged in a circumferentially spaced apart manner. The sealing assembly 224 includes a plate 226 configured to be disposed around at least a portion of the external surface 222 (see FIG. 3) of the guide vane 204. The plate 226 may include a first portion 252, a second portion 254, and a third portion 256. In some examples, the plate 226 may include a two part design that may be joined via welding, brazing, soldering, diffusion boding, fastening of one or more parts using mechanical fasteners, and the like. In other examples, the plate 226 may be cast using a lost wax process. The plate 226 is spaced apart from the external surface 222 of the guide vane 204 to define a clearance 228 therebetween. The clearance 228 between the plate 226 and the guide vane 204 may be uniform or the clearance 228 may vary, as per application requirements. In some examples, the plate 226 may be made of a metallic material. In other examples, the plate 226 may be made of a composite or any other material, without limiting the scope of the present disclosure. Further, the plate 226 defines a plurality of openings 230 (shown in FIG. 6) extending therethrough. Each of the plurality of openings 230 is in fluid communication with the clearance 228 between the plate 226 and the guide vane 204.

The sealing assembly 224 further includes a manifold 232 coupled to the plate 226 and configured to receive pressurized fluid therein. The manifold 232 is disposed around the plate 226. The manifold 232 is spaced apart from the plate 226. The sealing assembly 224 further includes a plurality of flow tubes 234, 235 extending between the manifold 232 and the plate 226. In some examples, the manifold 232 may be manufactured via diffusion bonding, welding, brazing, soldering, or fastening of one or more parts using mechanical fasteners. In other examples, the manifold 232 may be cast using a lost wax process. In some examples, the manifold 232 may be made of a metallic material. In other examples, the manifold 232 may be made of a composite or any other material, without limiting the scope of the present disclosure.

Each of the plurality of flow tubes 234, 235 defines a flow passage 248 (shown in FIG. 6) that is in fluid communication with a corresponding opening 230 in the plate 226. In some embodiments, at least some of the plurality of flow tubes 234 extend orthogonally relative to the plate 226 of the sealing assembly 224. The plurality of flow tubes 234 may extend orthogonally based on a profile of the guide vane 204 as well as a location of the flow tube 234 relative to the guide vane 204. For example, the flow tubes 234 disposed along the pressure surface 214 (see FIG. 3) or the suction surface 212 (see FIG. 3) may extend orthogonally relative to the plate 226 of the sealing assembly 224.

In some embodiments, at least some of the plurality of flow tubes 235 extend obliquely relative to the plate 226 of the sealing assembly 224. The plurality of flow tubes 235 may extend obliquely based on the profile of the guide vane 204 as well as a location of the flow tube 235 relative to the guide vane 204. For example, some of the flow tubes 235 disposed proximal to the leading edge 208 or the trailing edge 210 of the guide vane 204 may extend obliquely relative to the plate 226 of the sealing assembly 224. In the embodiment illustrated in FIG. 5, two flow tubes 235 are shown obliquely inclined relative to the plate 226. In other embodiments, any number of flow tubes 234, 235 may extend orthogonally or obliquely relative to the guide vane 204. It should be noted that, by virtue of the orientation of the flow tubes 234, 235, the flow tubes 234 jet the pressurized air in a direction that impinges on the guide vane 204 at 90 degrees to the external surface 222 of the guide vane 204 and the flow tubes 235 are orientated at an inclined angle and as such the jets of pressurized air from the flow tubes 235 impinge the external surface 222 of the guide vane 204 at a compound angle as may be preferential to minimize leakage across the sealing assembly 224. As the air moves across the guide vane 204 from the leading edge 208 to the trailing edge 210, when operating as a diffuser in a compressing mode, the air velocity decelerates and the air pressure increases. Pressure at the trailing edge 210 will be higher than pressure at the leading edge 208. The air in the intended non-flowing region 246 of the sealing assembly 224 may attain a mid-point pressure value at a pseudo mid-point. As such, air that flows radially outboard of the pseudo mid-point on the guide vane 204 tends to leak from the flow region 244 through the sealing assembly 224 and into the intended non-flowing region 246 where the pressure is lower, which tends to leak back into the flow region 244 proximal to the leading edge 208 of the guide vane 204, which is not desirable. Hence, it may be advantageous to angle the jets of pressurized air radially outboard of the pseudo mid-pressure point of the guide vane 204 away from normal to the guide vane 204 and slightly towards the flow region 244 of the guide vane 204. Similarly, it may be preferential to angle the jets of pressurized air inboard of the pseudo mid-pressure point of the guide vane 204 and slightly towards the intended non-flowing region 246 of the guide vane 204. Thus, employing tilted flow tubes may be beneficial in discouraging the re-circulatory leakage flows.

Figure 6:
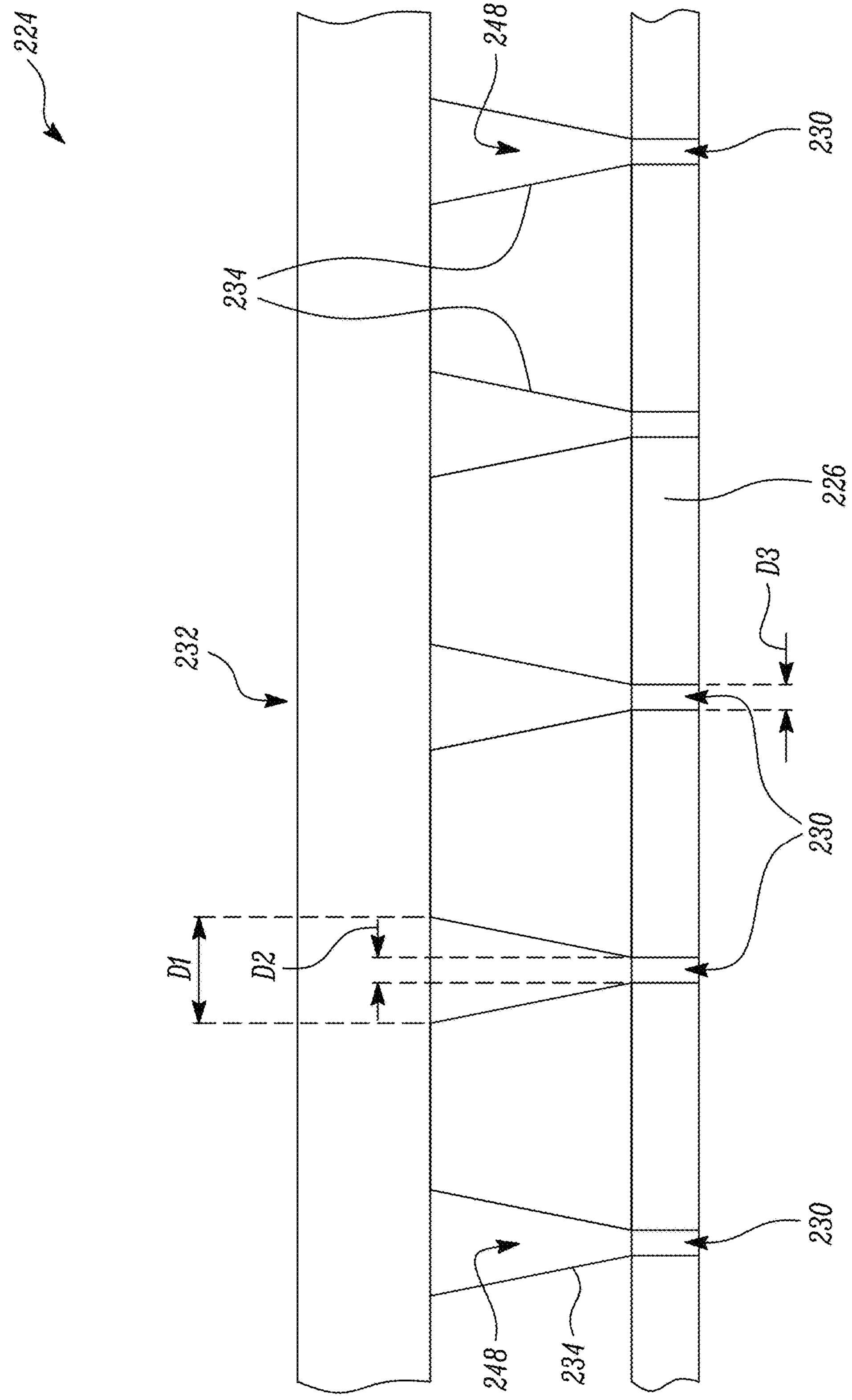
FIG. 6 is an enlarged schematic view of a portion of a sealing assembly associated with the guide vane system of FIG. 5.

FIG. 6 is an enlarged schematic view of a portion of the sealing assembly 224. Each of the plurality of flow tubes 234, 235 are configured to receive the pressurized fluid from the manifold 232. Each opening 230 in the plate 226 receives the pressurized fluid from a corresponding flow tube 234, 235 (see FIG. 5) of the plurality of flow tubes 234, 235 to direct a jet of pressurized fluid towards the external surface 222 (see FIG. 3) of the guide vane 204 to seal the clearance 228 (see FIG. 5) between the plate 226 and the guide vane 204 (see FIG. 5).

In some embodiments, at least some of the plurality of flow tubes 234, 235 include different average cross-sectional areas. The flow tubes 234, 235 with different average cross-sectional areas may be used to modify a pressure drop that the flow experiences as it flows through the flow tubes 234, 235. Further, the flow tubes 234, 235 with different average cross-sectional areas may direct jets of pressurized fluid at different speed, pressure, and flow rates towards the external surface 222 of the guide vane 204 to seal the clearance 228 between the plate 226 and the guide vane 204. The flow tubes 234, 235 may be designed to balance the delivery pressure proximal to the guide vane 204 with a main gas path pressure at that location around the guide vane 204.

In some embodiments, each of the plurality of flow tubes 234, 235 has a variable cross-sectional area. The plurality of flow tubes 234, 235 having the variable cross-sectional area may direct jets of pressurized fluid towards the clearance 228 between the plate 226 and the guide vane 204, thereby providing efficient sealing between the flow region 244 (see FIG. 4) and the intended non-flowing region 246 (see FIG. 4). The plurality of flow tubes 234, 235 defines a first diameter D1 proximal to the manifold 232 and a second diameter D2 proximal to the plate 226. The first diameter D1 is greater than the second diameter D2, such that the flow tubes 234, 235 define a tapering cross-sectional area. Further, the opening 230 in the plate 226 defines a diameter D3 that corresponds to the second diameter D2 of the plurality of flow tubes 234, 235. Each of the flow tubes 234, 235 may be shaped as a nozzle to accelerate and control the pressurized fluid received from the manifold 232.

In some embodiments, at least some of the plurality of openings 230 in the plate 226 include different cross-sectional areas. Specifically, the diameter D3 of each opening 230 corresponds to the second diameter D2 of the corresponding flow tube 234, 235. Thus, if the second diameter D2 is different for the flow tubes 234, 235, the corresponding diameter D3 of the openings 230 may also be different. The plurality of openings 230 with different cross-sectional areas may balance a delivery pressure proximal to the guide vane 204 with a main fluid path pressure at that location around the guide vane 204 (see FIG. 5). The plurality of openings 230 in the plate 226 may act as a piccolo tube and may form a seal around the corresponding guide vane 204 to prevent the leakage of fluid across the sealing assembly 224. Further, the plurality of openings 230 with different cross-sectional areas may enhance sealing around the guide vane 204.

Referring again to FIG. 5, the guide vane system 200 further includes an annular ring 236 fixedly coupled to each guide vane assembly 202. The annular ring 236 includes an annular chamber 238 disposed in fluid communication with the manifold 232 of the sealing assembly 224 of each guide vane assembly 202. The annular chamber 238 is configured to receive the pressurized fluid and direct the pressurized fluid towards the manifold 232 of the sealing assembly 224 of each guide vane assembly 202. Specifically, the annular chamber 238 of the guide vane system 200 is configured to receive the pressurized fluid from the upstream end 124 (see FIG. 2) or the downstream end 126 (see FIG. 2) of the rotor assembly 122 (see FIG. 2). The design of the annular chamber 238 described herein is exemplary in nature, and the annular chamber 238 may have a different geometry that may allow to receive and direct a desired volume of the pressurized fluid towards the manifold 232. Thus, the annular chamber 238 may receive the pressurized fluid bled from the upstream end 124 or the downstream end 126 of the rotor assembly 122. In other words, the annular chamber 238 may receive the pressurized fluid bled from the upstream end 124 or the downstream end 126 of the rotary machine 118 (see FIG. 2), such as the compressor. Alternatively, the annular chamber 238 may receive the pressurized air from the leading edge 208 or the trailing edge 210 of the guide vane 204. Further, the sealing assembly 224 may maximize an efficiency of the rotary machine 118 of the cabin blower system 100 (see FIG. 2) by preventing flow separation and/or turbulence.

In some examples, the sealing assembly 224 includes a feed chamber 240. The feed chamber 240 is disposed between the manifold 232 and the annular chamber 238 and provides fluid communication between the manifold 232 and the annular chamber 238. The feed chamber 240 is configured to receive the pressurized fluid from the annular chamber 238 and direct the pressurized fluid towards the manifold 232.

Figure 7:
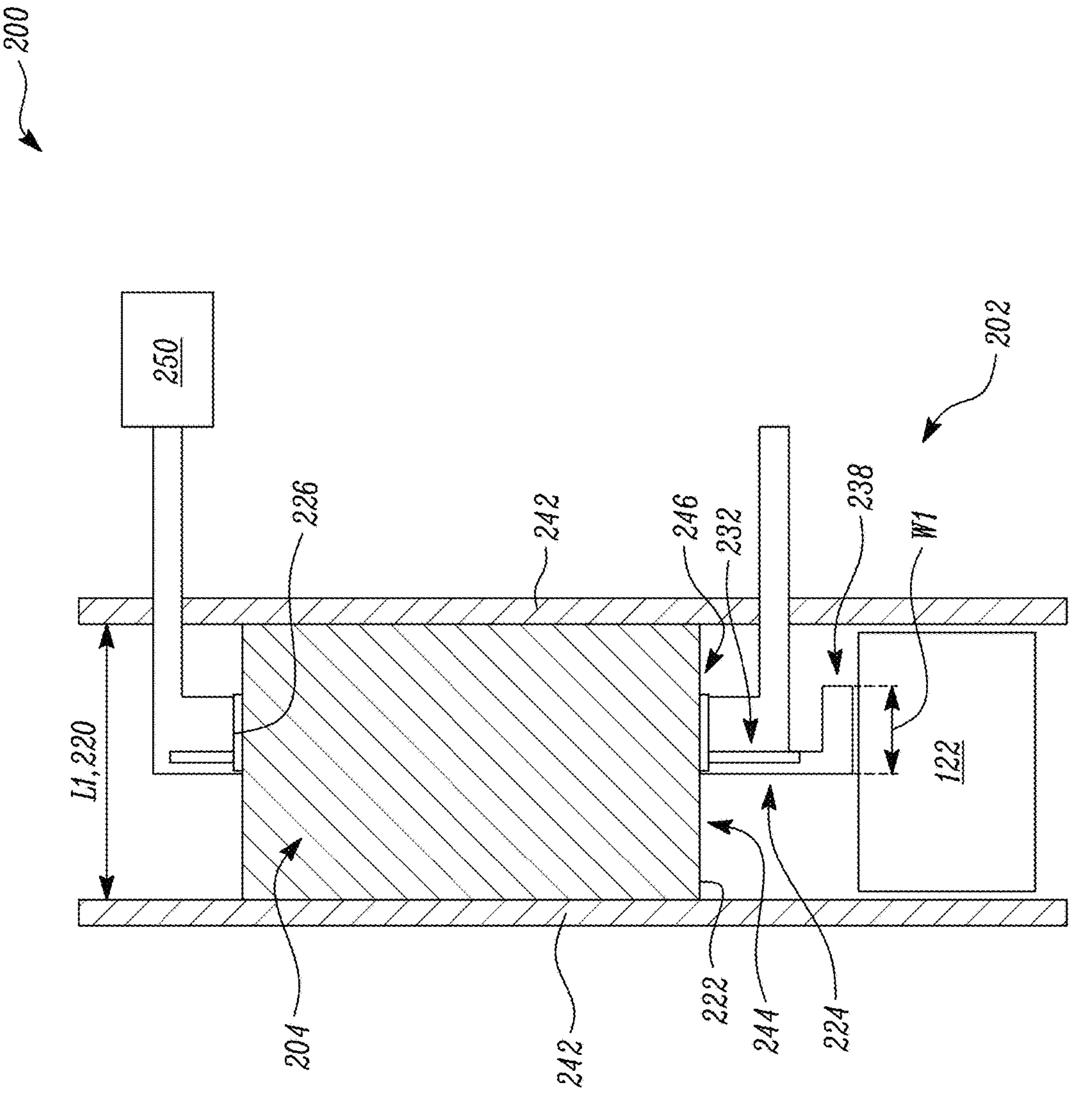
FIG. 7 is a schematic sectional top view of the guide vane system of FIG. 5.

FIG. 7 is a schematic sectional top view of the guide vane system 200. The guide vane system 200 includes a pair of end plates 242 coupled to the guide vane 204 of each guide vane assembly 202. The pair of end plates 242 are spaced apart from each other along the span 220 of the guide vane 204. The sealing assembly 224 is slidable along the span 220 of the guide vane 204 between the pair of end plates 242.

The sealing assembly 224 may slide along the span 220 of the guide vane 204 between the pair of end plates 242 to prevent leakage from the flow region 244 towards the intended non-flowing region 246, which may increase the efficiency of the guide vane system 200 and facilitate stable operation of the guide vane system 200.

The guide vane assembly 202 further includes an actuator 250 operatively coupled to the sealing assembly 224. The actuator 250 is configured to slide the sealing assembly 224 along the span 220 of the guide vane 204 relative to the guide vane 204. In some examples, the actuator 250 may include a pneumatic actuator, a hydraulic actuator, a fluidic actuator, an electric actuator, or a passive actuator arrangement that may be configured to slide the sealing assembly 224 along the span 220. As the actuator 250 facilitates sliding of the sealing assembly 224 along the span length L1, the flow region 244 of the guide vane 204 may be varied which may in turn allow tuning of air flow being directed by the guide vane 204.

In some examples, the actuator 250 may be communicably coupled to a controller (not shown). The controller may control the actuation of the actuator 250 such that the actuator 250 may slide the sealing assembly 224 along the span 220 of the guide vane 204 relative to the guide vane 204 based on a desired pressure and a desired flow area requirement in the flow region 244. In some examples, the controller may be a control circuit, a computer, a microprocessor, a microcomputer, a central processing unit, or any suitable device or apparatus.

The sealing assembly 224 described herein provides a non-contacting and non-wearing means to seal the clearance 228 (see FIG. 5) around the guide vane 204. The sealing assembly 224 of the present disclosure uses the pressurized fluid to seal the clearance 228 between the plate 226 and the guide vane 204. The sealing assembly 224 may prevent the leakage of fluid around a perimeter of the guide vane 204 i.e., around the pressure surface 214 (see FIG. 3) and the suction surface 212 (see FIG. 3) of the aerofoil 206 (see FIG. 3) and may ensure smooth operation of the guide vane assembly 202. Further, the plate 226 and the manifold 232 may be made of a metallic material and does not include any moving parts. Since the sealing assembly 224 has a substantially smaller number of moving parts and does not mechanically contact the guide vane 204, the sealing assembly 224 may be capable to withstand high operational temperatures and may be less susceptible to wear and tear. Thus, the sealing assembly 224 may have an improved life cycle and may also reduce maintenance as well as replacement costs associated with the guide vane assembly 202. Also, the sealing assembly 224 may eliminate any frictional sealing translational forces between the guide vane 204 and the plate 226 of the sealing assembly 224, thereby reducing actuation system force requirements and force margins. Furthermore, the plate 226 and the manifold 232 of the sealing assembly 224 may be less prone to wear thereby increasing an efficiency of the sealing assembly 224.

The sealing assembly 224 may eliminate mechanical side loading forces such as toeing and heeling of the plate 226 onto each guide vane 204. The sealing assembly 224 may be simple in construction, may be easy to manufacture in a cost-effective manner, and may increase the efficiency of the guide vane assembly 202. Furthermore, the sealing assembly 224 may be associated with various guide vane systems that may be disposed upstream or downstream of various types of compressors or turbines. For example, the sealing assembly 224 may be associated with guide vanes on any inward flow radial turbine application. Further, the sealing assembly 224 may be employed in any fixed guide vane, i.e., non-rotational vanes, having a variable flow area geometry based on application requirements.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A guide vane assembly comprising:

a guide vane including an aerofoil including a leading edge, a trailing edge, a suction surface, a pressure surface, a root, and a tip, the aerofoil defining a chordal axis of the guide vane between the leading edge and the trailing edge, the aerofoil further defining a span of the guide vane between the root and the tip, the pressure surface and the suction surface together defining an external surface of the guide vane; and a sealing assembly slidable along the span of the guide vane relative to the guide vane and extending along the chordal axis and the span of the guide vane, the sealing assembly including:

a plate configured to be disposed around at least a portion of the external surface of the guide vane, wherein the plate is spaced apart from the external surface of the guide vane to define a clearance therebetween, wherein the plate defines a plurality of openings extending therethrough, and wherein each of the plurality of openings is in fluid communication with the clearance between the plate and the guide vane;

a manifold coupled to the plate and configured to receive pressurized fluid therein, wherein the manifold is disposed around the plate; and a plurality of flow tubes extending between the manifold and the plate, wherein each of the plurality of flow tubes defines a flow passage that is in fluid communication with a corresponding one of the openings in the plate, wherein each of the plurality of flow tubes are configured to receive the pressurized fluid from the manifold, and wherein each opening in the plate receives the pressurized fluid from a corresponding flow tube of the plurality of flow tubes to direct a jet of pressurized fluid towards the external surface of the guide vane to seal the clearance between the plate and the guide vane.

2. The guide vane assembly of claim 1, wherein a width of the sealing assembly parallel to the span is less than a span length of the guide vane along the span, such that the sealing assembly divides the external surface of the guide vane between a flow region extending from the tip and an intended non-flowing region extending from the root, wherein the sealing assembly is configured to prevent a leakage of fluid between the flow region and the intended non-flowing region, and wherein the sealing assembly is further configured to vary an area of the flow region by sliding along the span of the guide vane.

3. The guide vane assembly of claim 1, further including an actuator operatively coupled to the sealing assembly, wherein the actuator is configured to slide the sealing assembly along the span of the guide vane relative to the guide vane.

4. The guide vane assembly of claim 1, wherein at least some of the plurality of flow tubes include different average cross-sectional areas.

5. The guide vane assembly of claim 1, wherein each of the plurality of flow tubes has a variable cross-sectional area.

6. The guide vane assembly of claim 1, wherein at least some of the plurality of openings in the plate include different cross-sectional areas.

7. The guide vane assembly of claim 1, wherein at least some of the plurality of flow tubes extend orthogonally relative to the plate of the sealing assembly.

8. The guide vane assembly of claim 1, wherein at least some of the plurality of flow tubes extend obliquely relative to the plate of the sealing assembly.

9. A guide vane system comprising:

a circumferential array of guide vane assemblies of claim 1; and an annular ring fixedly coupled to each guide vane assembly and including an annular chamber disposed in fluid communication with the manifold of the sealing assembly of each guide vane assembly, wherein the annular chamber is configured to receive the pressurized fluid and direct the pressurized fluid towards the manifold of the sealing assembly of each guide vane assembly.

10. The guide vane system of claim 9, further comprising a pair of end plates coupled to the guide vane of each guide vane assembly, wherein the pair of end plates are spaced apart from each other along the span of the guide vane, and wherein the sealing assembly is slidable along the span of the guide vane between the pair of end plates.

11. A rotary machine comprising:

a rotor assembly including an upstream end and a downstream end; and the guide vane system of claim 9, wherein the annular chamber of the guide vane system is configured to receive the pressurized fluid from the upstream end or the downstream end of the rotor assembly.

12. The rotary machine of claim 11, wherein the rotor assembly includes a compressor.

13. The rotary machine of claim 11, wherein the guide vane system is disposed downstream of the rotor assembly.

14. The rotary machine of claim 11, wherein the guide vane system is disposed upstream of the rotor assembly.

* * * * *